Nov. 28, 1950

L. F. LARSEN 2,531,694

TANK TRAILER

Filed April 14, 1947

INVENTOR.
Louis F. Larsen
BY
ATTORNEY

Nov. 28, 1950     L. F. LARSEN     2,531,694
TANK TRAILER
Filed April 14, 1947     3 Sheets-Sheet 2
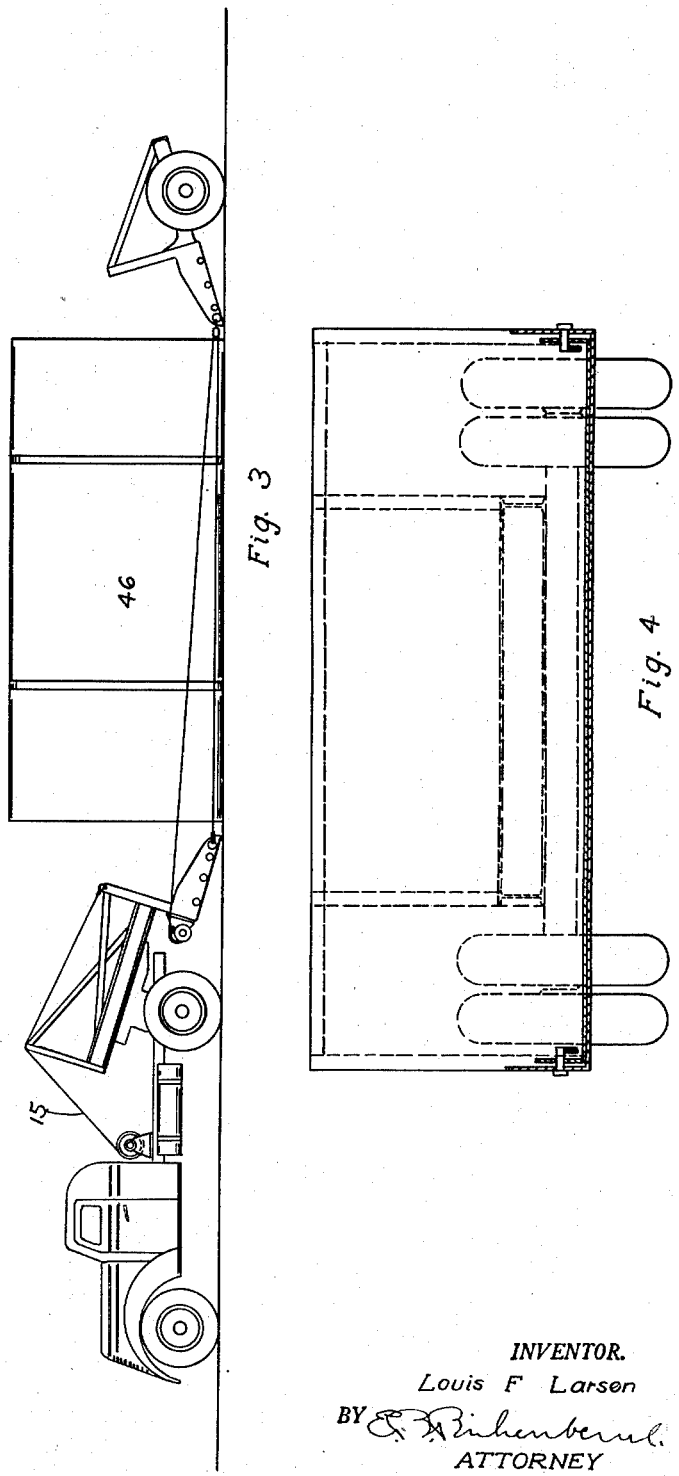
INVENTOR.
Louis F Larsen
BY
ATTORNEY Nov. 28, 1950     L. F. LARSEN     2,531,694
TANK TRAILER
Filed April 14, 1947     3 Sheets-Sheet 3
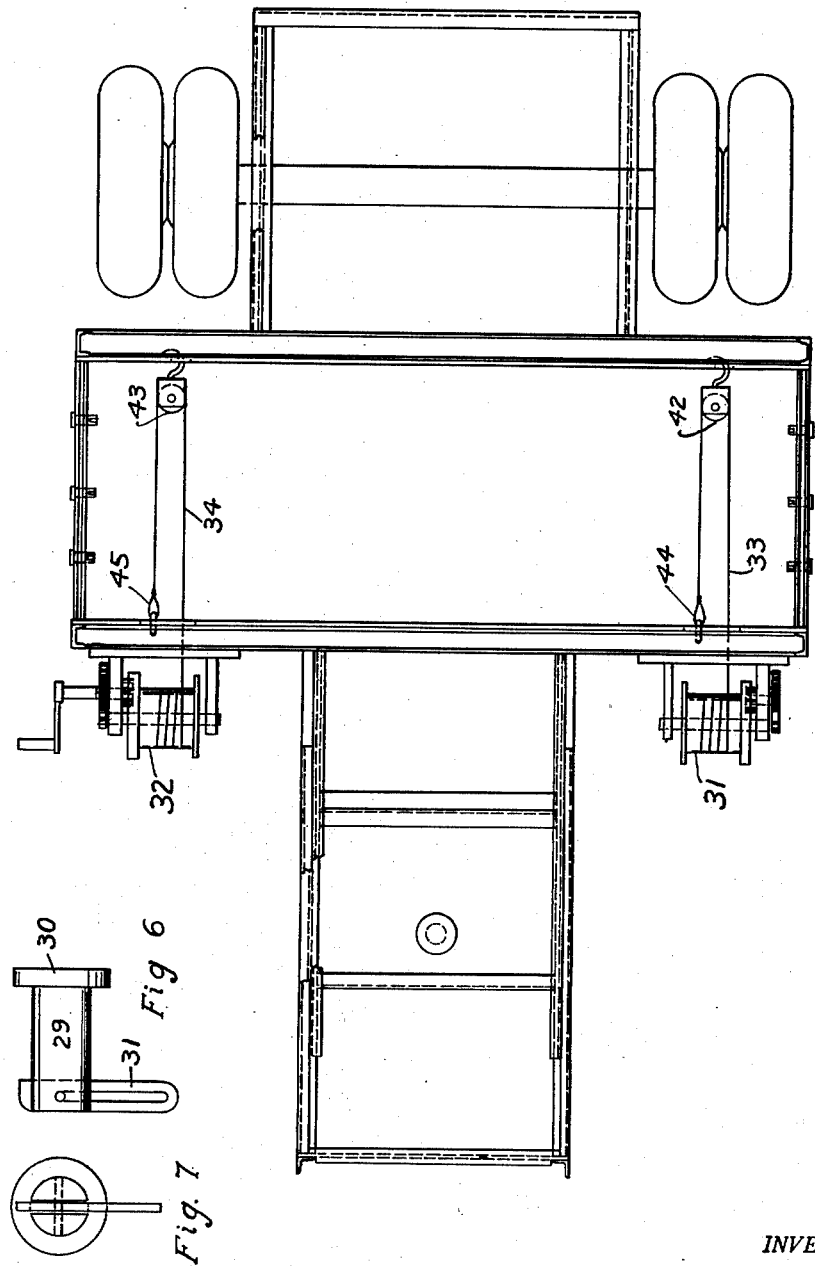
INVENTOR.
Louis F. Larsen
BY
ATTORNEY Patented Nov. 28, 1950

2,531,694

UNITED STATES PATENT OFFICE 2,531,694

TANK TRAILER

Louis F. Larsen, Portland, Oreg.

Application April 14, 1947, Serial No. 741,199

2 Claims. (Cl. 214—65)

This invention relates generally to the automotive industry and particularly to a tank trailer especially adapted for moving elongated tanks.

The main object of this invention is to provide a vehicle whereby long horizontal tanks may be easily picked up, moved from place to place and set down with a minimum amount of effort and with the expenditure of the least amount of time.

The second object is to make it possible to move a tank without the need of raising it higher than required for road clearance in order to insure a low center of gravity.

I accomplish these and other objects in the manner set forth in the following specification as illustrated in the accompanying drawing, in which:

Fig. 3 is an extended view showing the equipment in position to pick up a tank.

Fig. 4 is a transverse section taken along the line 4—4 in Fig. 2.

Fig. 5 is a plan of the device.

Fig. 6 is a side elevation of a locking pin.

Fig. 7 is an end elevation of Fig. 5.

Similar numbers of reference refer to the same or similar parts throughout the several views.

Figure 1:
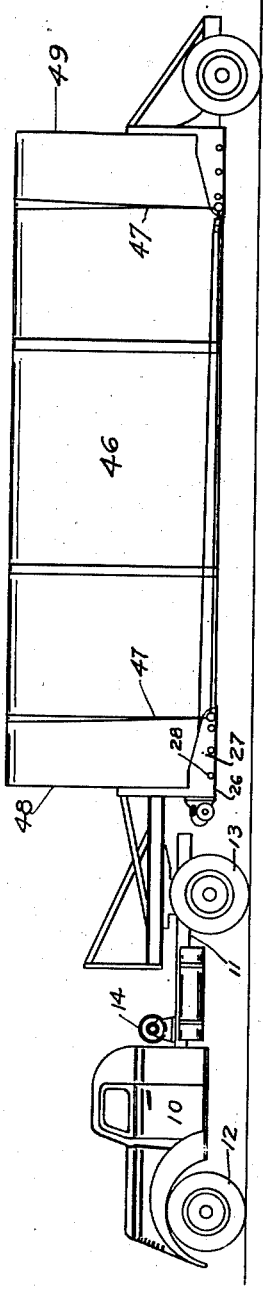
Fig. 1 is a side elevation showing the truck and trailer in a tank transporting position.
Figure 2:
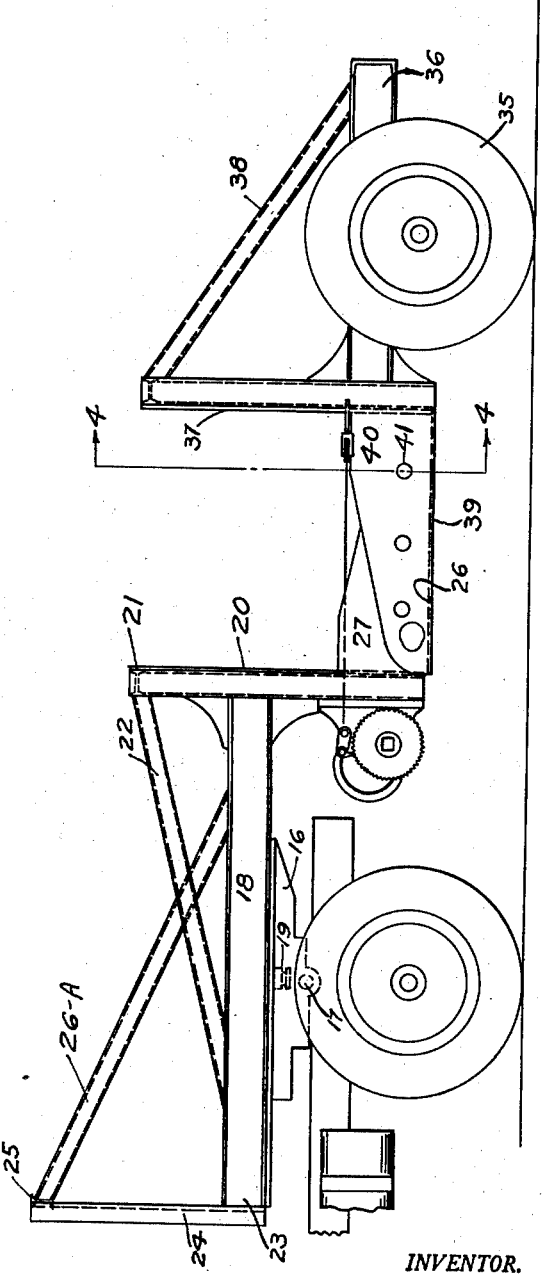
Fig. 2 is a fragmentary side elevation showing the trailer unloaded and in a traveling position.

Referring in detail to the drawings, there is shown a common form of truck 10 whose chassis 11 is supported by the wheels 12 and 13; on the chassis 11 is mounted the usual cable-winding winch 14 provided with a line 15. On the chassis is mounted the bolster table 16 which is supported by the transverse pivot 17 which is universal in that the table 16 must be free to move in any direction.

Referring in detail to my invention, same will be seen to consist of two main parts which for convenience will be referred to as the front section and the rear section.

The front section consists of a frame 18 which is revolvable on the table 16 about the axis of the pin 19 which journals in the table 16. Secured to the rear end of the frame 18 is the upright head 20 whose upper end 21 is secured by the brace 22 to the frame 18. On the foremost end 23 of the frame 18 is mounted a pair of uprights 24 which are tied at their upper ends by the horizontal beam 25 and are braced by the members 26A to the frame 18. Secured to the lower end of the head 20 and normal thereto is a foot 26 in whose sides 27 are formed the holes 28 for the pins 29 having heads 30 on one end and having a slotted key 31 slidably mounted in the other end thereof. This is an old construction and its purpose is merely to provide a pin which is easily removable. The key 31 normally hangs in the position shown in Fig. 6 but is moved to an axial position when inserted or withdrawn. In front of the head 20 are mounted the manually operated cable-winding winches 31A and 32 on which are wound the lines 33 and 34.

The rear section is provided with a pair of trailer wheels 35 upon which is mounted a trailer chassis 36 which is provided with a head 37 braced to the chassis 36 by means of the braces 38.

The head 37 is provided with a foot 39 whose sides 40 can telescope along the outside of the sides 27. The sides 40 are provided with holes 41 which can register with the holes 28 in the sides 27 when the trailer is in an unloaded traveling position. To the head 37 are attached the sheaves 42 and 43 around which pass the lines 33 and 34 to the anchors 44 and 45 on the head 20. The line 15 is secured to the beam 25. There is also illustrated a tank 46 which this trailer is designed to transport. Lashing lines 47 are also indicated to show how the tank is held down in the cradle formed by the feet 26 and 39.

In the operation of this equipment, the truck and trailer are moved to the position shown in Fig. 3 in which the foot 26 is held against digging into the ground by the line 15. The winches 31 and 32 are now operated, drawing the feet 26 and 39 under the tank 46 until the upper ends of the heads 20 and 37 engage the ends 48 and 49 of the tank 46. Any further tightening of the lines 33 and 34 will lift the tank to the position shown in Fig. 1 when the lashings 47 may be put in place.

While I have illustrated certain details in the construction of this equipment, it will be understood that these may be modified in detail without departing from the spirit of this invention.

I claim:

1. In a tank transporting trailer of the class described the combination of a truck having a universally tiltable table mounted thereon, a front section having a frame mounted on said table said frame having a rearwardly extending foot rigidly connected thereto, means on said truck for controlling the angle of tilt of said foot, a rear section having a pair of ground-engaging wheels and having a forwardly extending foot tiltably supported by said wheels, each of said feet having a head normal thereto and a cable-winding means for drawing the adjacent ends of said feet together with the heads against the tank ends.

2. The combination of a truck having a fifth wheel on the upper rear end thereof, an upright front head section supported by said fifth wheel and having a rearwardly extending foot at the bottom of said upright section and a rear trailing section having a forwardly extending foot including a head section normal thereto, cable-winding drums having cables between the front and rear feet and means for controlling the tilting position of the front and rear feet.

LOUIS F. LARSEN.

REFERENCES CITED

The following references are of record in the file of this patent:

UNITED STATES PATENTS

| Number | Name | Date |
|---|---|---|
| 1,996,695 | Bigley, Jr. | Apr. 2, 1935 |
| 2,058,955 | Culemeyer | Oct. 27, 1936 |
| 2,375,720 | Wood | May 8, 1945 |
| 2,389,211 | Pointer | Nov. 20, 1945 |

FOREIGN PATENTS

| Number | Country | Date |
|---|---|---|
| 252,631 | Great Britain | June 3, 1926 |
| 262,560 | Great Britain | Dec. 16, 1926 |
| 27,459 | Austria | Feb. 11, 1907 |